Patented Oct. 15, 1929

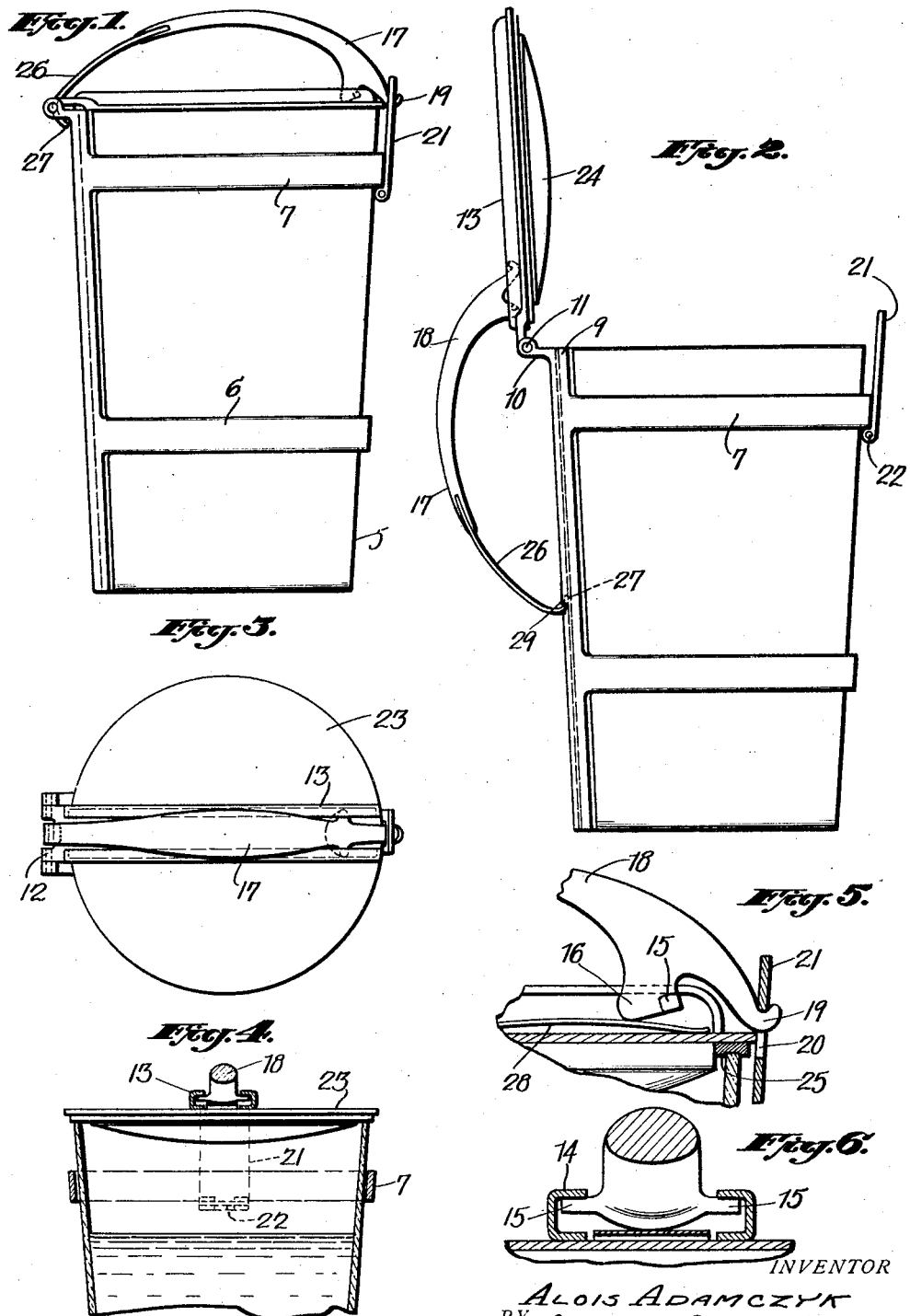

1,731,405

UNITED STATES PATENT OFFICE

ALOIS ADAMCZYK, OF WHITE PLAINS, NEW YORK

JAR HOLDER AND COVER

Application filed May 12, 1928. Serial No. 277,241.

This invention relates to jar holders and covers and in particular to a construction in which a portion of the holder constitutes a handle for the device.

A particular object of the invention is to provide a holding device for receptacles, such for instance, as a glass jar, the holder having secured thereto, a suitable lid and handle.

A further particular object of the invention is to provide in connection with a holder of the type referred to, a slidable handle member which will serve not only as a carrying handle but will also serve as a handle for tilting the receptacle to empty its contents, this handle serving also as a locking member to retain the cover in closed position, when desired.

A still further object of the invention is to provide, in conection with a receptacle cover, a slidable handle member which will retain the cover in open position and which will also serve to retain the cover in closed position.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in side elevation showing my improved construction, the receptacle lid being illustrated in closed position and the handle serving to latch the same in said closed position.

Figure 2 is a view similar to Figure 1, showing the lid opened and the handle thrown down to position to serve as a handle for the receptacle whereby the contents may be emptied.

Figure 3 is a top plan view of the device illustrated in Figure 1.

Figure 4 is a section taken through the receptacle and holder and arranged to illustrate the relative position of the handle, cover and one of the holding frame members.

Figure 5 is an enlarged, fragmentary view of the end of the handle showing the same engaging the keeper plate to retain the cover in closed position, and Figure 6 is a fragmentary section or end view of the construction shown in Figure 5 showing the formation of the lips on the handle member whereby the same can have sliding movement relative to the cover.

Referring to the drawings in detail, 5 indicates a receptacle, such as a glass jar which is arranged to be seated and held in the band members 6 and 7 of a holding device, the upper band member being indicated by the numeral 7 and the lower by the numeral 6, both of the band members being formed integral with a vertically positioned strip 8 which at its upper terminus 9 is offset as at 10 to provide a hinge eye through which the hinge pin 11 passes. This hinge pin also passes through the extended portion 12 of a guide 13, the edges of which are turned over as at 14 to provide a passageway for the extended lip 15 formed on the opposite side of the foot 16 provided at the forward end of the handle member 17.

This handle member consists of a solid portion 18, the front, as before described, being provided with the foot 16 and being further extended to provide the latch end 19, this latch end being arranged to engage in the eye 20 of a keeper plate 21, the keeper plate being hinged as at 22 or otherwise secured to the upper band member 7 of the holder construction.

The guide 13 is slotted or otherwise secured to the cover 23 which is arranged to cover the top of the receptacle 5, as illustrated in Figure 1, this cover being provided with an under convex portion 24 which provides, at its edges, a flange so that the cover itself will be properly positioned within the receptacle, the outer edge of the cover, on the under side, being arranged to receive, if desired, a rubber gasket whereby the receptacle will be rendered liquid-proof or air-proof.

It is my intention to manipulate the handle 18 in various ways and to accomplish this, I have provided one end of the handle portion 18 with the spring member or extension 26, the lower end of which is hooked as at 27 so that, as illustrated in Figure 1, this hook will prevent the handle from being pulled out between the opening left between the extensions 12 of the guide strip and will enable the user to pick the jar up by the handle 17 without danger of the latter becoming loose, it of course, being understood that the hooked or latched end 19 of the handle piece 18 will engage the keeper plate 21 and will be maintained in position therein through the medium of a flat spring 28 which is positioned within the guide 13 and on top of the cover 23 and over which rides the extended portion or foot 16 of the handle piece 18, this spring serving to maintain the lip 15 at all times in connection with the under side of the overturned portion 13 of the guide, thus maintaining the latch 19 in position within the keeper plate.

When it is desired to unlock the cover, it is simply necessary to press down on the solid portion 18 of the handle to compress the spring 28 at which time the catch 19 can be released from the keeper plate and the handle can be moved back to position to raise the cover to the position shown in Figure 2, at which time, the spring end 26 of the handle will slide down along the vertical strip 8 until the hooked end 27 of said piece 26 engages in a suitable cut-out 29 in said strip.

It is quite evident that when the handle is drawn back, the lips 15 engaging in the guide 13 will, of course, raise the lid 23 and the hook, as before described, will catch in the opening 29 to maintain the lid in its open position. When, however, it is desired to close the lid, the spring piece 26 will be moved so that the hooked end thereof disengages the opening 29 at which time the movement of the handle 17 will cause the lid 23 to close and as soon as the handle 18 has moved forward in the guide and the front end thereof been depressed against the action of the spring 28, the catch end 19 will engage the opening in the keeper plate 21 and thus secure the lid in its closed position.

It is quite evident, therefore, that I have provided a combination jar holder, cover and handle, the latter of which operates to not only hold the cover closed but also operates to hold it open and serves as a handle for the carrying of the container at all times whether it be opened or closed.

It is evident that my device could well be applied to a milk container or glass, for instance, in which the milk could be stored and from which the milk could be drunk, the cover being clamped tightly thereon to maintain the milk in sanitary condition and the cover being maintained in its open position and the handle serving as a grip whereby the receptacle could be raised for a child, for instance, for the drinking of the contents.

It is also evident that through the medium of the spring end on the handle, the hooked extremity thereof will automatically snap into the opening in the back of the vertical strip 8 of the holder.

It is also evident that the lower ring 6 being of smaller diameter than the upper ring 7, will permit a receptacle to be positioned therein without danger of its falling out.

It is also evident that I have provided a receptacle holder embodying a cover and locking handle which has few parts and which can be made up at small cost.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A jar holder and cover comprising jar encircling band members, a vertical strip to which said members are connected, a lid hinged to said strip, a handle for the holder, a guide piece on the lid in which one end of said handle slides, a keeper plate on one of the band members arranged to be engaged by the handle, and a spring in the guide piece for maintaining the handle in connection with the keeper plate.

2. A jar holder and cover comprising jar encircling band members, a vertical strip having an opening therein and to which said members are connected, a lid hinged to said strip, guide channels on the lid, a handle, lips adjacent one end of the handle for slidably engaging said channels and a resilient extension on said handle, the end of which is arranged to yieldably engage in said strip opening.

3. A jar holder and cover comprising a vertical strip, a jar encircling band carried by said strip, a lid cover hinged to the upper end of the strip, a keeper plate on the band, a handle slidable on said cover and a hook at the front of the handle for engaging the keeper plate to retain the cover in closed position.

4. A jar holder and cover comprising a vertical strip having an opening therein, jar encircling bands carried by said strip, a cover hinged to the upper end of the strip, guide channels on the cover, a handle, lips adjacent one end of the handle for slidably engaging said channels, a resilient extension on said handle, the end of which is arranged to yieldably engage in said strip openings, a keeper plate on one of the bands adjacent the periphery of the cover and a latch hook in the front of the handle for engaging the keeper plate to retain the cover in closed position.

5. A jar holder and cover comprising a vertical strip having an opening therein, an extension on the upper end of the strip, jar encircling bands carried by said strip, a cover hinged to the extension on the strip, a guide channel on the cover, a spring in said channel, a handle, lips adjacent one end of the handle for slidably engaging said channel, the lips being arranged to be yieldably retained therein by said spring, a resilient extension on said handle, the end of which is hooked to yieldably engage in said strip openings, a keeper plate on one of the bands adjacent the periphery of the cover, a latch at the front of the handle for engaging the keeper plate to retain the cover in closed position and the hooked end of the handle extension being arranged to engage the end of the channel member whereby the jar can be carried by the handle.

In testimony whereof I affix my signature.

ALOIS ADAMCZYK. [L. S.]